United States Patent
Huang

(10) Patent No.: US 6,352,342 B1
(45) Date of Patent: Mar. 5, 2002

(54) AUXILIARY EYEWEAR WITH LATERALLY DISTANT MAGNETS ON LENS RETAINING MECHANISMS

(76) Inventor: David Huang, 4F, No. 335, Sz-Yuan Rd., Shin-Chuang City, Taipei Hsien (TW)

( * ) Notice: Subject to any disclaimer, the term of this patent is extended or adjusted under 35 U.S.C. 154(b) by 0 days.

(21) Appl. No.: 09/685,957

(22) Filed: Oct. 11, 2000

(51) Int. Cl.[7] .................................................. G02C 9/00
(52) U.S. Cl. .......................................... 351/47; 351/57
(58) Field of Search ............................ 351/47, 48, 57, 351/58, 45, 46, 44, 41, 158

(56) References Cited

U.S. PATENT DOCUMENTS

| | | | |
|---|---|---|---|
| 5,568,207 A | 10/1996 | Chao | 351/57 |
| 5,682,222 A | 10/1997 | Chao | 351/111 |
| 5,737,054 A | 4/1998 | Chao | 351/47 |
| 5,786,880 A | 7/1998 | Chao | 351/41 |
| 5,877,838 A | 3/1999 | Chao | 351/47 |
| 5,882,101 A | 3/1999 | Chao | 351/47 |
| 5,883,688 A | 3/1999 | Chao | 351/47 |
| 5,883,689 A | 3/1999 | Chao | 351/47 |
| 5,929,964 A | 7/1999 | Chao | 351/47 |
| 5,975,691 A | 11/1999 | Ku | 351/47 |
| 6,012,811 A | 1/2000 | Chao et al. | 351/47 |
| 6,053,611 A | 4/2000 | Ku | 351/47 |
| 6,089,708 A | 7/2000 | Ku | 351/47 |
| 6,092,896 A | 7/2000 | Chao et al. | 351/47 |
| 6,139,142 A | * 10/2000 | Zelman | 351/57 |

* cited by examiner

Primary Examiner—Hung Xuan Dang
(74) Attorney, Agent, or Firm—Ladas & Parry

(57) ABSTRACT

Disclosed is an eyewear comprising: an auxiliary frame including: two auxiliary lenses; an auxiliary lens retaining mechanism for retaining the auxiliary lenses in opposed relation; and an attachment mechanism joined to the auxiliary lens retaining mechanism and having two auxiliary magnets at opposing ends thereof; and a primary frame including: two primary lenses forming a lens plane; two primary lens retaining mechanisms for retaining the primary lenses; a nose bridge connecting the primary lens retaining mechanisms in opposed relation; two temples hingedly extending from outer ends of the primary lens retaining mechanism in a direction substantially orthogonal to the lens plane; and two laterally distant, primary magnets each affixed to each of the primary lens retaining mechanism at locations allowing magnetic coupling to the auxiliary magnets. In a further embodiment, the auxiliary lens retaining mechanism of the auxiliary frame is frictionally, pivotally joined to the attachment mechanism to allow flipping up the auxiliary frame when not in use.

19 Claims, 3 Drawing Sheets

AUXILIARY EYEWEAR WITH LATERALLY DISTANT MAGNETS ON LENS RETAINING MECHANISMS

FIELD OF INVENTION

This invention is related to an eyewear, and more particularly to a primary and an auxiliary eyewear each having magnets at lens retaining mechanisms thereof for attachment.

BACKGROUND OF INVENTION

Auxiliary frames with lenses have been used for decades to augment deficiencies in primary frames. For example, the auxiliary frames may be for magnifying purposes, or may transform the primary frames into sunglasses.

For decades, people around the world have been creating numerous ingenious methods to attach the auxiliary frames onto the primary frames. In one line of approaches, the auxiliary frames are clipped onto the lenses of the primary frames. Not only do such clips obstruct the wearer's vision, they may scratch the lenses of the primary frames. To alleviate the defect of view obstruction, there are designs using small clips at the edges of the frames. However, these small clips still create scratches on the lenses and the primary frames; and attaching these auxiliary frames with small clips requires some maneuvering with two hands, and it would not be easy to do so, for example, if one is driving. Also, to detach such an auxiliary frame from its primary frame, one typically have to push down at its bridge and warp the frames outward on both sides of the lenses. It is not uncommon for such actions to permanently deform the auxiliary frame.

Another approach uses two pairs of magnets instead of clips, with one pair on the primary frame and the other on the auxiliary frame. The magnets are located on the plane of the lenses, and are close to the temples of the frames. Since they are on the plane of the lenses, they have to be carefully designed so that they can blend into the general style of the frame, without being too conspicuous. One way is to make the magnets very small. With gravity pulling the auxiliary frame away from its primary frame, the magnets have to be of certain size so as to have sufficient magnetic power to hold the auxiliary frame to the primary frame.

One reason for the magnets to be close to the temples is that the pair of magnets on a frame should be as far apart as possible. This is to ensure the auxiliary frame to be right over the primary frame, not only at the locations close to the bridges of the frames, but also at the locations close to the arms of the frames. However, in order to have sufficient coupling power, the magnets on the auxiliary frame have to match in both locations and orientations to the magnets on the primary frame. This is not an easy task especially because the magnets are typically very small for stylistic reasons.

The further away the pair of magnets are on a frame, the more difficult it is to align them in both locations and orientations to magnets on another frame. First, imagine the magnets in a primary frame are slightly off in locations from those in an auxiliary frame. Since the magnets are quite small, slight misalignment in the locations would significantly reduce magnetic coupling between the frames. Next, imagine one small magnet in the primary frame is different in orientation from its corresponding magnet in the auxiliary frame. This can happen, for example, if the auxiliary frame has been slightly twisted—the magnitude of the difference is proportional to the distance between the pair of magnets on the frame. Two magnets may not even be able to couple together if they have different orientations. Misalignment in locations or orientations not only adversely affects the coupling power of the auxiliary frame to the primary frame, but also creates an unpleasant outward appearance for the wearer, especially when the auxiliary frame is tilted relative to the primary frame.

Another defect with providing the magnets on the temples is that, means cannot be provided to allow the auxiliary frames to flip up, such that the user must remove the auxiliary frames when one does not intend to use the auxiliary frames. There is a higher probability that the user will lose the auxiliary frames by removing the auxiliary frames from the primary frames.

To solve the above problems, one solution is to provide attachment mechanisms on nose bridges of the primary and auxiliary frames, where the attachment mechanism may include a single pair of magnets on the nose bridges of the primary and auxiliary frames such that a flipping mechanism may be added to the auxiliary frames, as disclosed in U.S. Pat. No. 6,089708. However, the attachment mechanisms provided on the nose bridges along result in a weaker structure and unsteady attachment between the primary and auxiliary frames than the attachment mechanisms provided on at least two distant locations of the eyewear.

It should be apparent from the foregoing that there is a need for improved apparatus to attach auxiliary frames to primary frames so that auxiliary frames can be easily, firmly and elegantly attached to primary frames and allowing flipping of the auxiliary frame if needed.

SUMMARY OF INVENTION

The present invention provides apparatus to easily, firmly and elegantly attach auxiliary frames to primary frames, based on magnets at the lens retaining mechanisms of the auxiliary eyewear. The invention has numerous advantages. For example, it creates a very strong support for attaching auxiliary frames to primary frames by providing a pair of distant magnets on an attachment mechanism of the auxiliary frames, it is relatively easy to manufacture, it is easier to blend into the general design of frames, and it makes the auxiliary frames easily applicable to primary frames even with just one hand.

In one embodiment, the auxiliary frames are of a simple construction that can be directly attached to or removed from the primary frames.

In a further embodiment, the auxiliary frames are provided with a flipping mechanism allowing the user to flip up the auxiliary frames when one no longer needs the auxiliary frames.

With the magnets at the lens retaining mechanisms, there are many other advantages. The magnets are much less conspicuous than magnets disposed on the plane of lenses, or the nose bridge of the eyewear, making them easier to design and to blend them into the general style of frames. The two pair of magnets each provided on the lens retaining mechanisms of the primary frames and the auxiliary frames, enhance the rigidity of attachment mechanism of the auxiliary frames and help the coupling of the auxiliary frames to the primary frames.

Not only is the present invention more elegant, easier to design, easier to manufacture and more secure in attachment than prior art approaches; a person can easily use one hand to attach an auxiliary frame onto a primary frame of the present invention.

Other aspects and advantages of the present invention will become apparent from the following detailed description, which, when taken in conjunction with the accompanying drawings, illustrates by way of example the principles of the invention.

Figure 1:
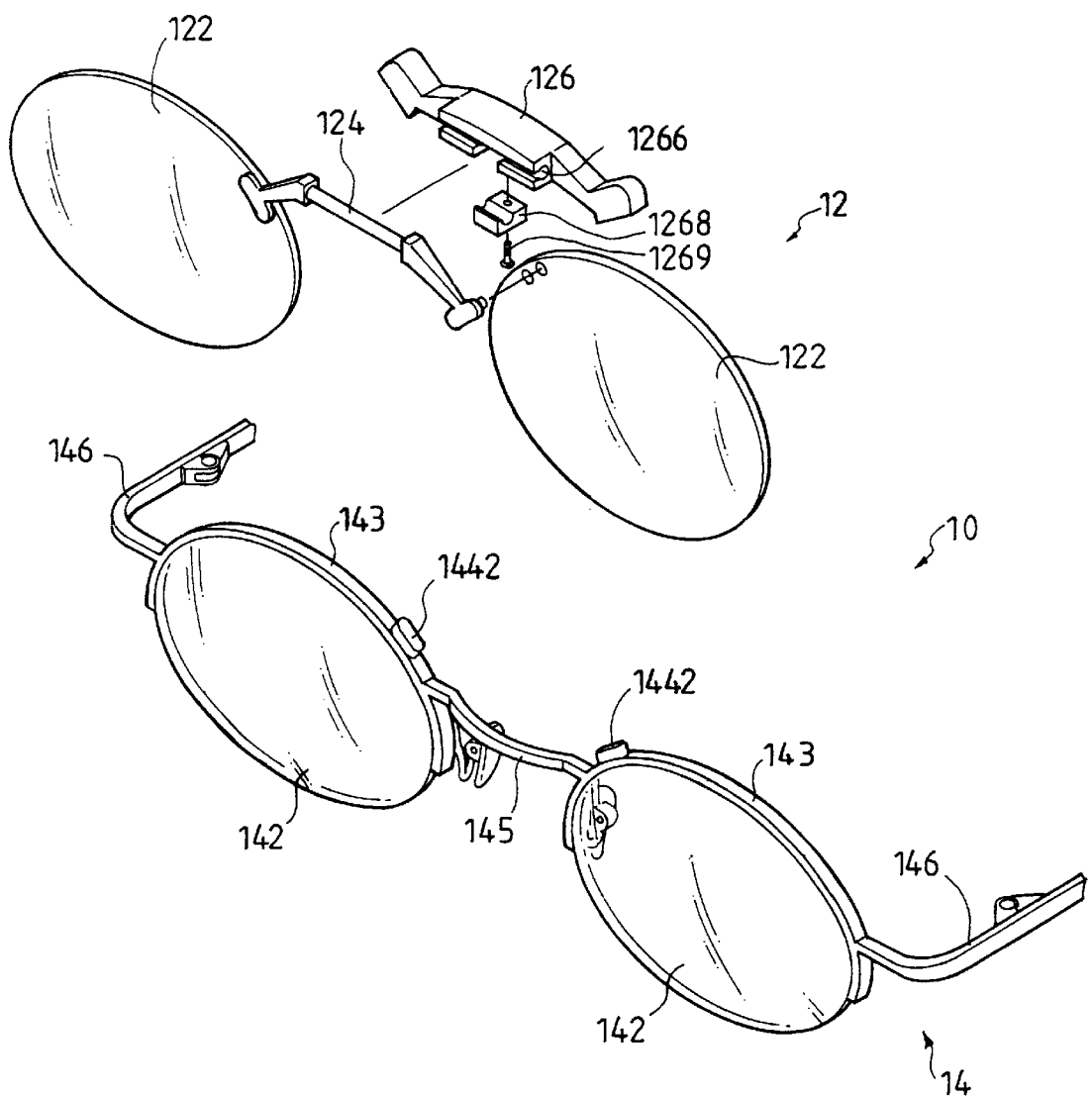
FIG. 1 shows a perspective, exploded view of an embodiment of this invention.
Figure 2:
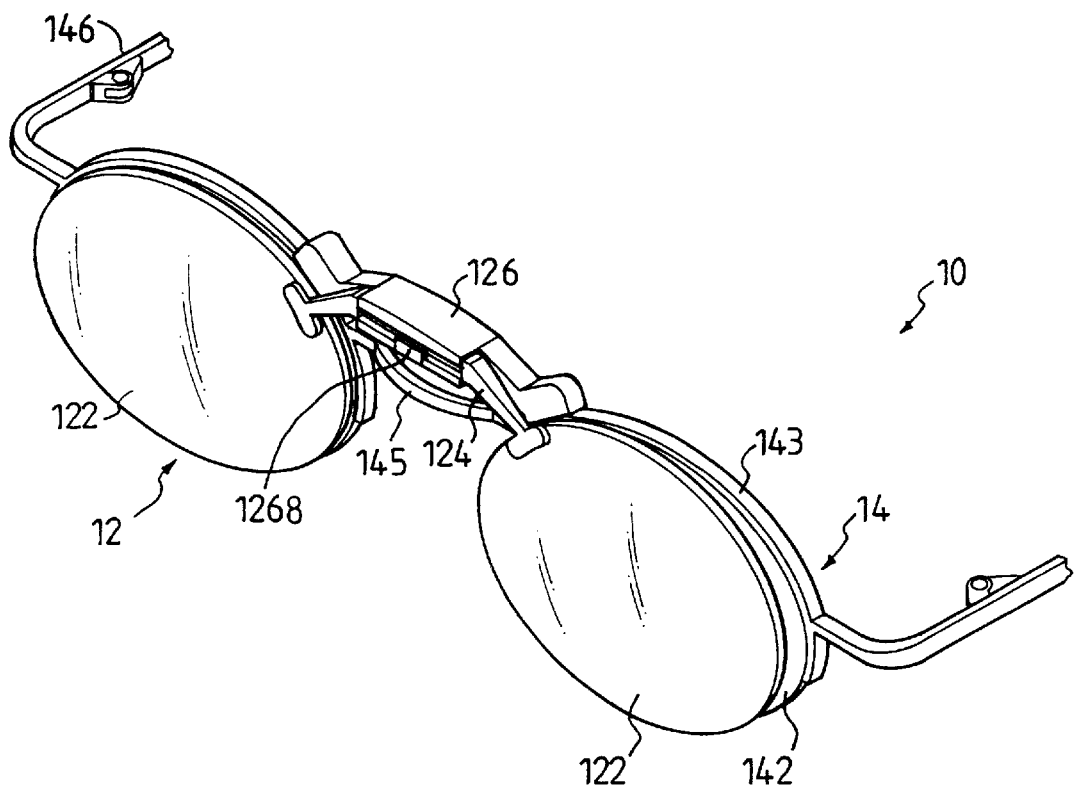
FIG. 2 shows a perspective, assembled view the embodiment in FIG. 1.
Figure 3:
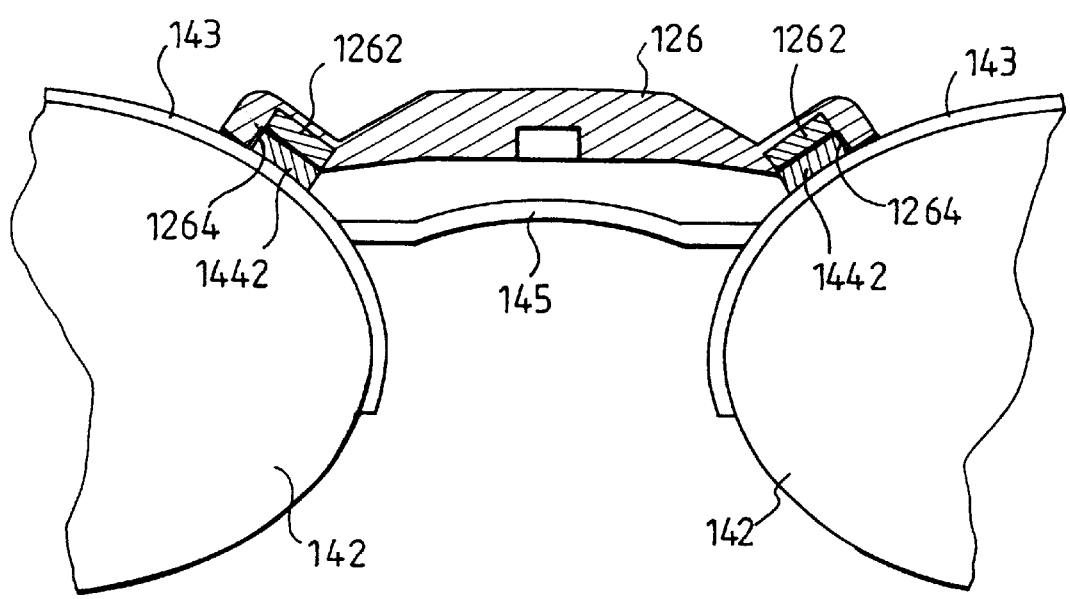
FIG. 3 is a cross-sectional view showing attachment relationship between the magnets of the primary and auxiliary frames.

Same numerals in FIGS. 1–3 are assigned to similar elements in all the figures. Embodiments of the invention are discussed below with reference to FIGS. 1–3. However, those skilled in the art will readily appreciate that the detailed description given herein with respect to these figures is for explanatory purposes as the invention extends beyond these limited embodiments.

DETAILED DESCRIPTIONS OF EMBODIMENTS

FIG. 1 shows a perspective, exploded view of eyewear 10 of this invention. The eyewear 10 includes an auxiliary frame 12 and a primary frame 14.

The auxiliary frame 12 includes two auxiliary lenses 122; an auxiliary lens retaining mechanism 124 for retaining the auxiliary lenses 122 in a laterally opposed relation; and an attachment mechanism 126 joined to the auxiliary lens retaining mechanism 124 and including two magnets 1262 (FIG. 3) respectively at laterally opposing positions (e.g. ends) thereof.

In this embodiment, the auxiliary lenses 122 are retained together by the auxiliary lens retaining mechanism 124. The auxiliary lenses 122 may also be retained within a pair of closed frames or partial wired frames that are connected by a bridge for stylish purposes.

The primary frame 14 includes two primary lenses 142 forming a lens plane; two primary lens retaining mechanisms 143 for retaining the primary lenses 144; a nose bridge 145 connecting the primary lens retaining mechanisms 143 in opposed relation; two temples 146 hingedly extending from outer ends of the primary lens retaining mechanism in a direction substantially orthogonal to the lens plane; and two laterally distant, primary magnets 1442 each affixed to each of the primary lens retaining mechanism 144 at locations allowing magnetic coupling to the auxiliary magnets 1262, as shown in this embodiment.

In an alternative embodiment, the laterally distant, primary magnets 1442 may also be provided at the primary lens retaining mechanisms 143 at locations juxtaposed to opposing ends of the nose bridge 145 or at the nose bridge 145 so long as these locations allow magnetic coupling to the auxiliary magnets 1262.

In use, the auxiliary magnets 1262 at the attachment mechanism 126 of the auxiliary frame 12 each magnetically couple to an associated primary magnet 1442 at the primary lens retaining mechanisms 143 of the primary frame 14.

As best illustrated in FIG. 3, the auxiliary magnets 1262 are provided at opposing ends of the attachment mechanism 126. Two cavities 1264 are preferred to be formed at the opposing ends of the attachment mechanism 126 for housing the auxiliary magnets 1262 and the primary magnets 1442 therein when the auxiliary frame 12 is coupled to the primary frame 14 so as to enhance alignment between the two frames 12, 14. FIG. 2 illustrates a state where the auxiliary frame 12 is magnetically coupled to the primary frame 14 via the attachment mechanism 126.

In this illustrated embodiment, the primary magnets 1442 are each located at an upper surface of each of the primary lens retaining mechanisms 143 for easy illustration; the primary magnets 1442 may also be located in front of or behind the lens plane at the primary lens retaining mechanisms 143. Preferably, by locating the primary magnets 1442 behind the lens plane helps to conceal the primary magnets 1442 when the auxiliary frame 12 is not coupled to the primary frame 14. Thickness of the primary magnets 1442 may vary and is dependent on the required attachment force. When the primary magnets 1442 are located behind or in front of the lens plane, the direction that the cavities 1264 face shall also change to accommodate the change of locations.

Returning to FIG. 1, the auxiliary lens retaining mechanism 124 of the auxiliary frame 12 may be frictionally, pivotally joined to the attachment mechanism 126 such that the auxiliary frame 12 may be flipped up when not in use. In this embodiment, the attachment mechanism 126 is formed with a length-wise groove 1266 for receiving the auxiliary lens retaining mechanism 124 therein. A frictioning block 1268 is provided to frictionally secure the auxiliary lens retaining mechanism 124 within the groove 1266, Frictional force which the frictioning block 1268 applies to the auxiliary lens retaining mechanism 124 may adjusted via a screw 1269, such that the auxiliary frame 12 may be flipped up to a desired orientation with respect to the primary frame 14.

If the auxiliary lenses 122 are shades, the eyewear acts as sunglasses when the auxiliary frame 12 are flipped down, preferably, sun rays should be prevented from entering into the gap between the primary lenses and the secondary lenses. Due to the location of the magnets, the intrusion of sunrays in between the primary and the auxiliary frames 12, 14 is substantially reduced.

The attachment mechanism 126 joined to the auxiliary lens retaining mechanism 124 allows the auxiliary frame 12 to be attached to the primary frame 14 in a much more steady manner. The distant magnets 1262 provided at opposing ends of the attachment mechanism provide a rigid construction that does not result in shaking of the auxiliary frame 12 when coupling the auxiliary frame 12 to the primary frame 14. Such advantages can further be appreciated when the flipping feature is added to the auxiliary frame 12, as the two-point coupling of the auxiliary frame 12 to the primary frame 14 via the auxiliary magnets 1262 prevents shaking of the auxiliary frame 12, and prevents accidental removal of the auxiliary frame 12 while performing the flipping action as compared with the one-point coupling provided on the nose bride along found in prior art.

Magnets used in this invention are selected to have sufficient magnetic power to couple the frames together. In the present invention, a magnet can be a permanent magnet or a magnetizable element, such as iron or magnetizable stainless steel. For magnetic coupling, at least one of the magnets is a permanent magnet. If both paired magnets on the primary and auxiliary frames are permanent magnets of opposite polarity at their coupling surfaces, the strength in magnetic coupling will be enhanced.

Different embodiments in the present invention can be combined in different ways. For example, many known, conventional flip-up arrangement, such as that implemented in U.S. Pat. No. 6,089,708, may be implemented to allow flip-up of the auxiliary frame. Also, it should be obvious to those skilled in the art the methods to build each embodiment. This specification will not further describe different fabrication techniques.

It should be noted that the different types of auxiliary frames and different forms of primary frames, individually, are also each a different embodiment of the present invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. Auxiliary eyewear, comprising:
   two auxiliary lenses;
   an auxiliary lens retaining mechanism for retaining the auxiliary lenses in a laterally opposing relation; and
   an attachment mechanism joined to the auxiliary lens retaining mechanism, the attachment mechanism having two magnets respectively at laterally opposing portions.

2. The auxiliary eyewear according to claim 1, wherein the opposing portions have cavities for respectively housing the magnets therein.

3. The auxiliary eyewear according to claim 1, wherein the auxiliary lens retaining mechanism is frictionally, pivotally joined to the attachment mechanism to allow the two auxiliary lenses retained thereon to be flipped up about the attachment mechanism.

4. The auxiliary eyewear according to claim 3, wherein the attachment mechanism includes a length-wise groove formed thereon for receiving and pivoting the auxiliary lens retaining mechanism, and includes a frictional block for securing the auxiliary lens retaining mechanism within the groove.

5. The auxiliary eyewear according to claim 1, wherein the auxiliary lenses are shades.

6. The auxiliary eyewear according to claim 1, wherein the auxiliary lenses are each retained within a closed frame.

7. The auxiliary eyewear according to claim 1, wherein the auxiliary lenses are each retained within a partial frame.

8. An eyewear, comprising:
   an auxiliary frame, including:
      two auxiliary lenses;
      an auxiliary lens retaining mechanism for retaining the auxiliary lenses in a laterally opposing relation; and
      an attachment mechanism joined to the auxiliary lens retaining mechanism, the attachment mechanism having two auxiliary magnets respectively at laterally opposing portions; and
   a primary frame including:
      two primary lenses defining a lens plane;
      a primary lens retaining mechanism for retaining the primary lenses in an opposing relation corresponding to the two auxiliary lenses;
      two temples hinging from outer ends of the primary lens retaining mechanism at a pivoting extent from a folded position to a position substantially orthogonal to the lens plane; and
      two laterally distant, primary magnets each affixed to the primary lens retaining mechanism in an opposing manner to allow the auxiliary magnets to be magnetically coupled to the primary magnets, and allow the auxiliary lenses to correspondingly overlap with the primary lenses.

9. The eyewear according to claim 8, wherein the attachment mechanism has two opposing ends formed with two cavities for respectively housing the auxiliary magnets and the primary magnets therein when the auxiliary frame is coupled to the primary frame.

10. The eyewear according to claim 8, wherein the auxiliary lens retaining mechanism is frictionally, pivotally joined to the attachment mechanism to allow the two auxiliary lenses retained thereon to be flipped up about the attachment mechanism.

11. The eyewear according to claim 10, wherein the attachment mechanism includes a length-wise groove formed thereon for receiving and pivoting the auxiliary lens retaining mechanism, and includes a frictional block for securing the auxiliary lens retaining mechanism within the groove.

12. The eyewear according to claim 8, wherein the auxiliary lenses are shades.

13. The eyewear according to claim 8, wherein the primary lens retaining mechanism has an upper surface to which the primary magnets are affixed.

14. The eyewear according to claim 8, wherein the primary lens retaining mechanism has a front surface to which the primary magnets are affixed.

15. The eyewear according to claim 8, wherein the primary lens retaining mechanism has a front surface to which the primary magnets are affixed.

16. The eyewear according to claim 8, wherein primary lens retaining mechanism has a nose, bridge having opposing ends, and the primary magnets are affixed at the lens retaining mechanism and juxtaposed at the opposing ends of the nose bridge.

17. The eyewear according to claim 8, wherein primary lens retaining mechanism has a nose bridge having opposing ends, and the primary magnets are located at the opposing ends of the nose bridge.

18. The eyewear according to claim 8, wherein the auxiliary lenses are each retained within a closed frame.

19. The eyewear according to claim 8, wherein the auxiliary lenses are each retained within a partial wired frame.

* * * * *